United States Patent [15] 3,691,315

Ellmore [45] Sept. 12, 1972

[54] HELICAL SCAN MAGNETIC RECORDER HAVING A CRITICAL ANGLE FOR THE TAPE AT THE ENTRANCE AND EXIT GUIDES IN THE HEAD DRUM

[72] Inventor: William A. Ellmore, Saratoga, Calif.

[73] Assignee: Ampex Corporation, Redwood City, Calif.

[22] Filed: Aug. 24, 1970

[21] Appl. No.: 66,253

[52] U.S. Cl. ..............179/100.2 T, 242/192, 242/195

[51] Int. Cl. ........G11b 5/52, G11b 15/66, G03b 1/58

[58] Field of Search ..........179/100.2 T; 178/6.6 FSS; 242/192, 195

[56] References Cited

UNITED STATES PATENTS

| | | | |
|---|---|---|---|
| 3,319,014 | 5/1967 | Sugawa | 179/100.2 T |
| 3,375,331 | 3/1968 | Okazaki et al. | 179/100.2 T |
| 3,312,407 | 4/1967 | Goldberg | 242/195 |
| 3,107,280 | 10/1963 | Svetsugu | 179/100.2 T |
| 3,414,684 | 12/1968 | Licmowsky | 179/100.2 T |
| 3,227,387 | 1/1966 | Laa et al. | 242/195 |
| 3,370,803 | 2/1968 | Newell | 242/192 |
| 3,149,797 | 9/1964 | Pastor et al. | 242/195 |
| 3,190,575 | 6/1965 | Hayner et al. | 242/195 |
| 3,126,161 | 3/1964 | Bemiss et al. | 242/195 |
| 3,432,084 | 3/1969 | Van Den Bussche | 179/100.2 T |

*Primary Examiner*—Bernard Konick
*Assistant Examiner*—Robert S. Tupper
*Attorney*—Robert G. Clay

[57] ABSTRACT

To facilitate automatic self-threading operation, a helical scan magnetic tape apparatus is arranged so that the tape centerline follows a path substantially parallel to the top plate of the machine, the scanning drum and guides therefor being tilted at an angle to the top plate. Exit and entrance guides for the tape at the drum are parallel to the drum axis and therefore also tilted, but all other tape guides are normal to the top plate. The tape is taken off the entrance and exit guides at a predetermined angle that ensures parallelism of the tape centerline to the top plate. A supply reel with the tape and a stiff leader mounted thereon is provided, together with means for driving the leader to the takeup reel, which is provided with means for securing and wrapping the leader and tape. The drum is also arranged for precise change of tilt to facilitate stop and slow motion effects. The tape supply reel is arranged for quick and easy mounting on, and removal from the apparatus. A scanner assembly transformer signal coupling and tachometer is also provided.

21 Claims, 9 Drawing Figures

INVENTOR.
WILLIAM A. ELLMORE

BY Robert G. Clay

ATTORNEY

INVENTOR.
WILLIAM A. ELLMORE

BY Robert G. Clay

ATTORNEY

INVENTOR.
WILLIAM A. ELLMORE
BY
Robert S. Clay
ATTORNEY

INVENTOR
WILLIAM A. ELLMORE

BY

ATTORNEY

HELICAL SCAN MAGNETIC RECORDER HAVING A CRITICAL ANGLE FOR THE TAPE AT THE ENTRANCE AND EXIT GUIDES IN THE HEAD DRUM

BACKGROUND OF THE INVENTION

This invention is related to helical scan magnetic tape apparatus and particularly to such machines having scanning drums tilted at an angle to the top plate of the machine.

Previously in the art, helical scan magnetic tape machines have been provided with scanning drums that are parallel to the transport top plate, with the tape being taken on and off at different levels; or with tilted drums having elliptical drum guides normal to the top plate; or with tilted drums and right cylindrical tilted drum guides together with various other tilted guide posts arranged to bring the tape into a path parallel with the top plate. The third type appears to be generally preferable for most uses, since the different tape path levels of the first type make the machine cumbersome and awkward, while the elliptical guide surfaces of the second type are difficult and expensive to machine and mount. A problem with the third type, however, is that the tilted guide posts are difficult to place at just the right angle, and may easily be bent out of alignment, and it is seldom readily apparent whether or not the guide posts are correctly aligned; and the adjustment thereof is extremely time consuming.

A further problem is that in many such machines, the tape supply reel is difficult to assemble on or remove from the machine.

It is therefore an object of the present invention to provide a tilted drum helical scan magnetic tape machine including improved means for guiding the tape with the centerline thereof in a path parallel to the top plate.

It is a further object of the invention to provide a machine as above described and arranged for automatic self-threading operation.

It is still another object of the invention to provide a machine as above described and arranged to facilitate stop motion and slow motion effects.

It is a still further object of the invention to provide a machine as above described in which the tape supply reel is quickly and easily mounted on or removed from the machine.

SUMMARY OF THE INVENTION

The above and other objects are provided in an apparatus in which the tape centerline follows a path substantially parallel to the top plate of the machine, the scanning drum and guides therefor being tilted at an angle to the top plate. Exit and entrance guides for the tape at the drum are parallel to the drum axis and therefore also tilted, but all other tape guides are normal to the top plate. The tape is taken off the entrance and exit guides at a predetermined angle that ensures parallelism of the tape centerline to the top plate. A supply reel with the tape and a stiff leader mounted thereon is provided, together with a means for driving the leader to the takeup reel, which is provided with means for securing and wrapping the leader and tape. The drum is also arranged for precise change of tilt to facilitate stop and slow motion effects. The tape supply reel is arranged for quick and easy mounting on and removal from the apparatus.

DESCRIPTION OF THE PREFERRED EMBODIMENTS

Figures 1, 9:
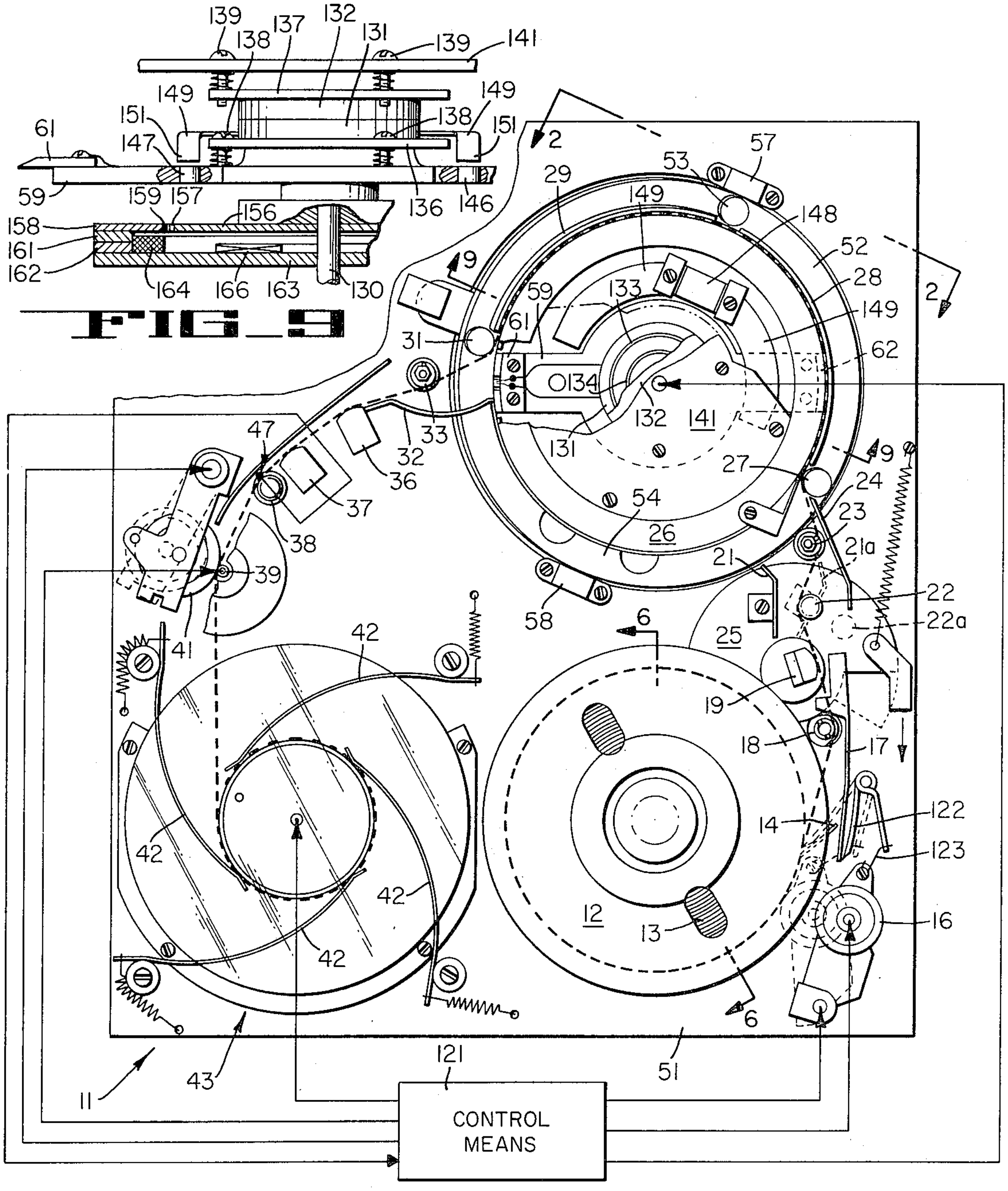
FIG. 1 is a partly schematic, and partly broken-away plan view of a helical-scan magnetic tape apparatus in accordance with the invention.
FIG. 9 is an enlarged fragmentary elevation view of a portion of the apparatus taken on the plane of lines 9—9 of FIG. 1.
Figures 2, 7:
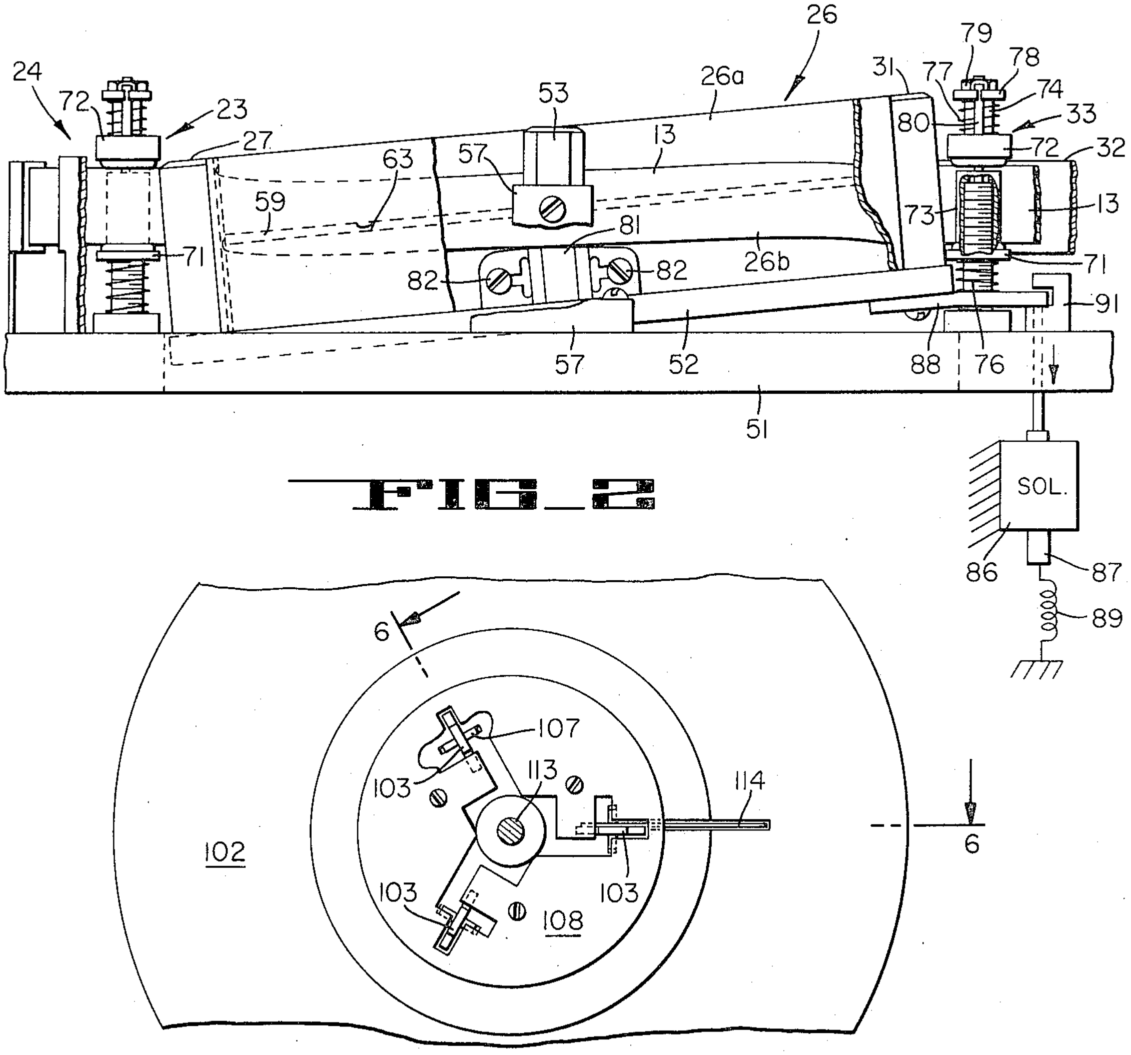
FIG. 2 is an enlarged scale broken-away elevation view taken along the plane of lines 2—2 of FIG. 1.
FIG. 7 is a broken-away bottom view of the apparatus of FIG. 6.

Referring now to the drawing, and particularly to FIGS. 1 and 2 thereof, there is shown a tape transport 11 including a supply reel 12 with tape 13 and a stiff leader 14 mounted thereon, and a retractable drive puck 16 for driving the leader along a threading path between a guide rail 17, a tension sensing arm post 18, a video erase head 19 mounted on a rotating plate 25, a movable threading guide rail 21 mounted on plate 25 (shown at 21*a* in its threading position), a pivoting guide post 22 also mounted on plate 25, shown at 22*a* in its retracted or threading position, a guide post 23 and rail 24 and between a scanning drum guide 26 and an entrance guide post 27. In threading, the leader continues between the scanning drum guide 26 and a pair of curved conforming guides 28 and 29 and an exit guide post 31. Emerging from the scanning drum guide, the leader continues between a stripping guide 32, a guide post 33, a guide rail 34 and a pair of longitudinal head stacks, 36, 37, an insulated guide post 38, and a capstan 39 and pinch roller 41. Continuing, the leader passes along a guide 42 and into a takeup reel housing 43 where a guide 44 causes the leader to frictionally engage a rubber coated takeup reel hub 46 and to become firmly wound thereon. Sensing means 47 are provided to sense the passage of a metal tab on the leader past the capstan and to automatically engage the capstan and pinch roller thereupon and concurrently retract the supply reel driving puck 16 to place the machine in condition for recording or playback. At the same time, the plate 25 may be moved to its operating position (solid lines) as will be described further below. The means 47 may be of any well-known type such as photo electric or electrical-contact, but in the present invention is a transistor circuit mounted on the insulated guide post 38 and activated by contact with an aluminum coated portion of the tape to generate an electrical signal current.

THE TILTED TAPE GUIDES

Of great importance in the threading operation above described as well as in recording and playing operation, is the fact that the leader and tape centerline follows a substantially planar path parallel to the top plate 51 of the machine, and all of the guiding and operating elements with the exception of the scanning guide 26 and the entrance and exit guide posts 27 and 31 therefor are set with their tape engaging surfaces strictly normal to the top plate 51. For simplicity of structure and assembly, the guides 26, 27 and 31 and the helical scanning assembly therefor are mounted as a unit upon a common mounting plate 52 formed as an integral flange with guide 26*b*, from which also extend a diametrically opposite pivot post 53 and mounting block 54, and trunnions (not shown) are provided to extend from post 53 and block 54 along a diameter into a pair of pivot brackets 57, 58, mounted in turn on the top plate 51, so that the assembly 26, 27, 31, 52, 53, 54 can be tilted to a suitable angle for causing a rotating scanning bar 59, on which are mounted a pair of 180° spaced heads 61, 62 to scan diagonal tracks on the tape 13 as the tape proceeds around the guide 26. To provide a slit or gap 63 for protrusion of the heads 61, 62, the guide 26 is divided into two spaced upper and lower halves 26*a* and 26*b*, the upper half 26*a* being mounted in cantilever fashion from the mounting block 54, or in addition also from post 53.

This structure has the advantage that all of the guides except those mounted on the plate 52 are mounted normal to the top plate, and the guides on plate 52 are normal thereto, and can be adjusted during manufacture very conveniently in only a few minutes, as opposed to several hours for adjustment of prior art guides.

Figure 3:
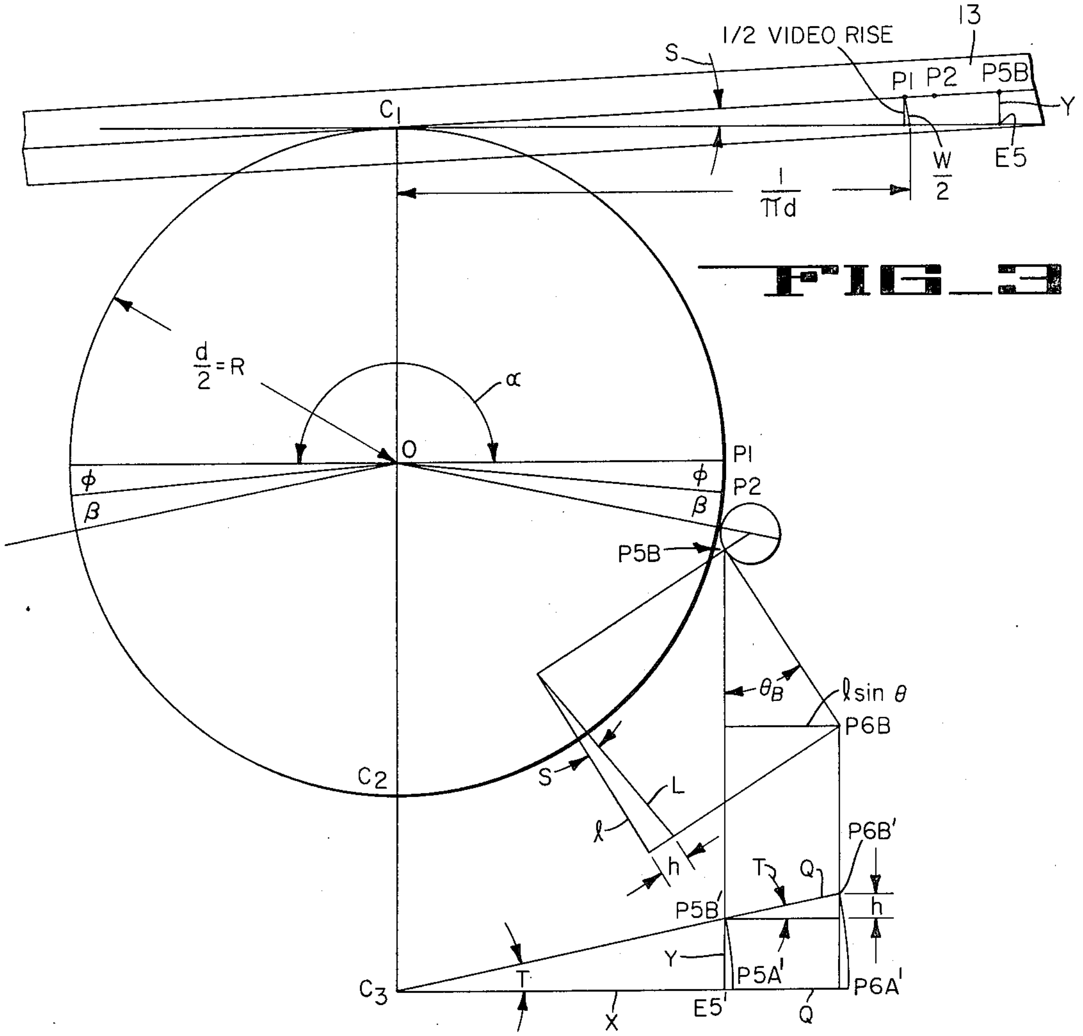
FIG. 3 is a schematic view illustrating certain features of the invention.

It will be seen from the Figures that the scanning assembly is of the two-headed 180° scan type, around which the tape is arranged in a wrap slightly greater than 180° in order to provide some overlap for switching of the heads. Assuming a predetermined diameter $d$ for guide 26 and effective tape width $w$ (i.e., the width of the portion of the tape that is allocated to the video tracks, corresponding to the "video rise"), it is then necessary to calculate three other parameters in order to ensure that the tape centerline remains substantially parallel to the transport top plate. The first of these parameters is the pitch angle S of the tape centerline with respect to a transverse plane of the head drum. This angle is calculated according to the equation:

$$\sin S = 2w/\pi d \qquad (1)$$

for a scanning angle of wrap of $\alpha = 180°$ for the tape centerline on the drum. The relationship is illustrated in FIG. 3, which is a schematic plan view of the scanning drum guide 26 and guide post 27 taken as if the axes of the two guides were not tilted but remained normal to the plane of the top plate, and with the tape at its correct pitch angle S unwrapped and turned 90° into the plane of the paper. The second parameter needed is the angle of tilt T of the head drum guide with respect to the desired plane of the tape centerline. This angle may be calculated from the relationship:

$$\tan T = Y/X, \qquad (2)$$

in which $Y$ is the vertical dimension ($y$-axis coordinate) (FIG. 3) between points P5B and E5, the point P5B being the untilted position of the point P5A, which is the point of tangency at which the tape centerline arrives at guide 27 from guide 23 (see also FIG. 4); and point E5 is the vertical projection of point P5B to the horizontal plane of axis $C_1$ $C_2$ $C_3$; while the term $X$ in Equation (2) is the horizontal dimension ($X$-axis coordinate) between the tilt axis $C_1$ $C_2$ $C_3$ (FIGS. 3, 4) and the untilted point P5B, also shown as dimension $C_3$-$E5'$ in the two Figures.

Figure 4:
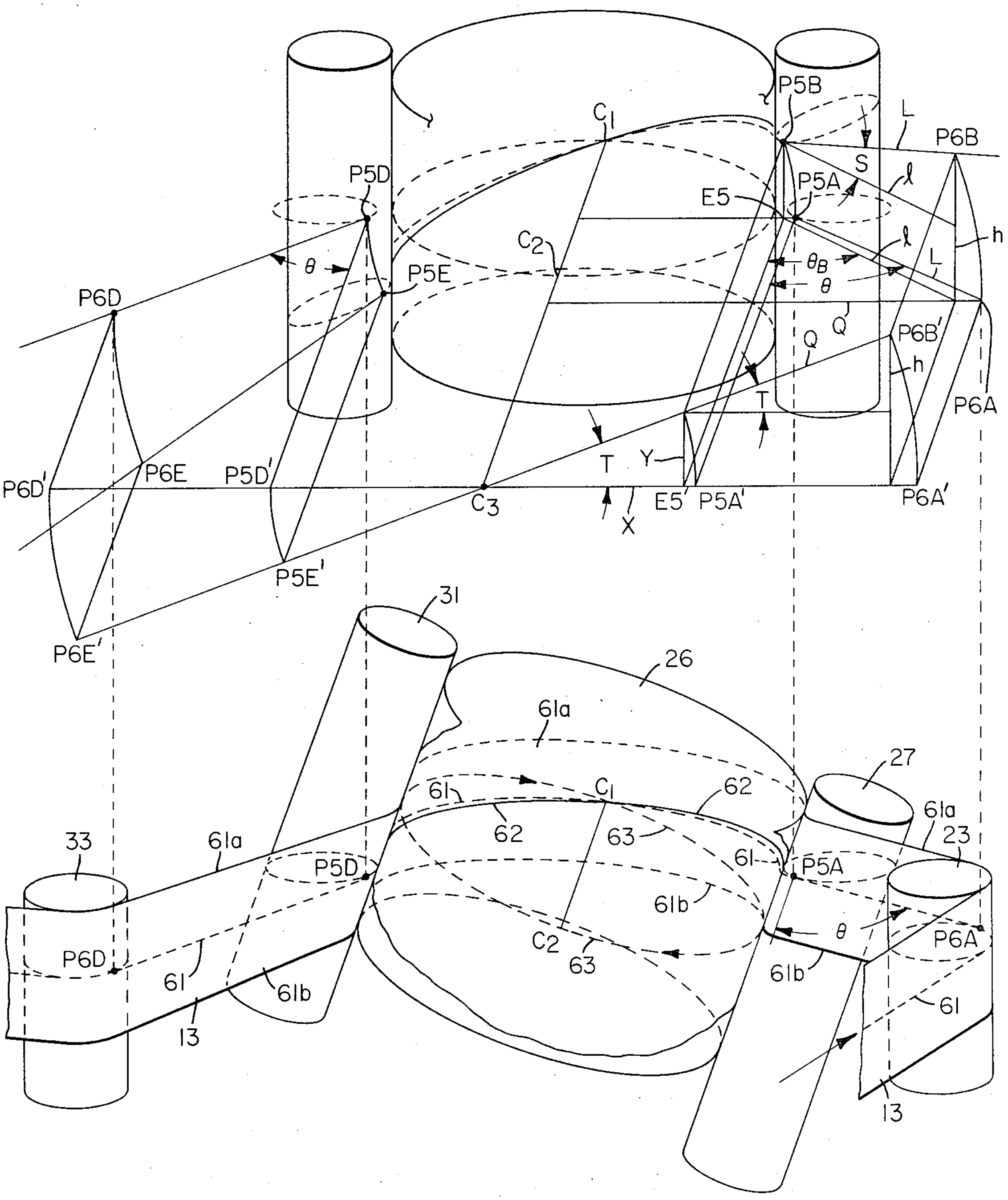
FIG. 4 is a perspective schematic view illustrating certain features of the invention.

The determination of the third dependent parameter $\theta$ needed for successfully conducting the tape parallel to the top plate is illustrated in FIG. 4. In the lower part of the Figure there is shown in schematic perspective a scanning guide 26 and axially parallel guide posts 27, 31, all tilted with respect to the plane of the top plate (the horizontal plane of the perspective sketch), and for the sake of simplicity having axes all lying in the same vertical plane parallel to that of the paper so that the tape has a wrap of exactly 180°; also a pair of flanking guide posts 23, 33 both strictly normal to the plane of the top plate. To achieve the parallel tape path desired, it is necessary to have the tape 13 centerline 61 lying in a horizontal plane at the following points: P6A, which is the point of tangency at which the tape centerline leaves the guide 23 on the way to guide 27; point P5A, which is the point of tangency at which the tape centerline arrives at guide 27; point $C_1$, which is the midpoint of the 180° tape centerline wrap angle on the guide 26, and is also the point at which the tape centerline crosses the diametrical tilt axis $C_1$ $C_2$ of the guide 26; point P5D, the point of tangency at which the tape centerline leaves the exit guide 31; and point P6D, the point of tangency at which the tape centerline arrives at guide 33. If these conditions are satisfied, then the tape centerline will be parallel to the top plate all the way to point P5A, although the tape edges 61*a* and 61*b* will be out of parallelism between guides 23 and 27 due to the twist induced in the tape in this segment. The tape centerline also passes through point $C_1$ in the same plane, but between P5A and $C_1$ drops below and then returns to the desired plane, the intersection of which with guide 26 is indicated at 62; while between $C_1$ and P5D the centerline climbs above and then returns to the desired plane. From P5D to P6D the centerline lies in the desired plane although the tape edges are not parallel to the top plate due to tape twist; and downstream from P6D, the centerline and tape edges all are parallel to the top plate. The path described by the rotating transducing heads is illustrated at 63. The third parameter referred to above as essential for ensuring the parallelism of the tape centerline and top plate is the angle $\theta$ at the point P5A between the tape centerline and a line in the horizontal plane parallel to the axis of tilt $C_1$ $C_2$. This angle $\theta$ is critical in that if it is too small or too large, either the tape centerline upstream from the guide drum will be out of parallelism with the top plate, or conversely if the centerline is kept in such parallelism, the centerline will tend to pass above or below point $C_1$, which also in undesirable, with one minor exception later to be described.

Angle $\theta$ is dependent on both the angles $T$ and S previously defined and may be precisely determined by means of the following equation:

$$\sin \theta = \sin S/\sin T \qquad (3)$$

The derivation of Equation (3) is best explained by reference to the upper portion of FIG. 4, which is a vertical projection of the lower portion with the difference only that the guides 26, 27, 31 together with the tape centerline are illustrated as rotated bodily about the axis $C_1$ $C_2$ $C_3$ and in effect backwards through angle $T$ to a vertical position of the axes of guides 26, 27, 31. Of course this position of the guides and tape is never used in practice, and is shown here only to facilitate understanding of the derivation of Equation (3).

Now in the Figure, the point $C_3$ is merely a projection horizontally of the axis $C_1$ $C_2$ to a vertical plane parallel to that of the paper so that angle $T$ may be shown more clearly. In rotating through angle $T$, point P6A moves to P6B and the two points may be projected horizontally as shown to the plane of $C_3$ to become P6A' and P6B' respectively. Likewise, in rotating through $T$, point P5A moves to P5B, projected as P5A' and P5B'. Other parameters of interest are: L the actual or straight line distance between P5B and P6B, or P5A and P6A; Q the dimension parallel to the plane of $C_3$ between P5A and P6A or P5B and P6B; and $h$ the vertical dimension between P5B and P6B. With these elements one may construct the following relationships:

$$\sin\theta = Q/L; \qquad (4)$$

$$\sin S = h/L; \qquad (5)$$

$$\sin T = h/Q; \qquad (6)$$

from which follows:

$$\sin\theta = h/\sin T \ h/\sin S; \text{ or}$$

$$\sin\theta = \sin S/\sin T.$$

Of course, similar relationships obtain on the exit side of the guide drum, where points P5E, P6E, P5D, P6D and their projected primes are shown, together with the same required angle $\theta$.

Figure 5:
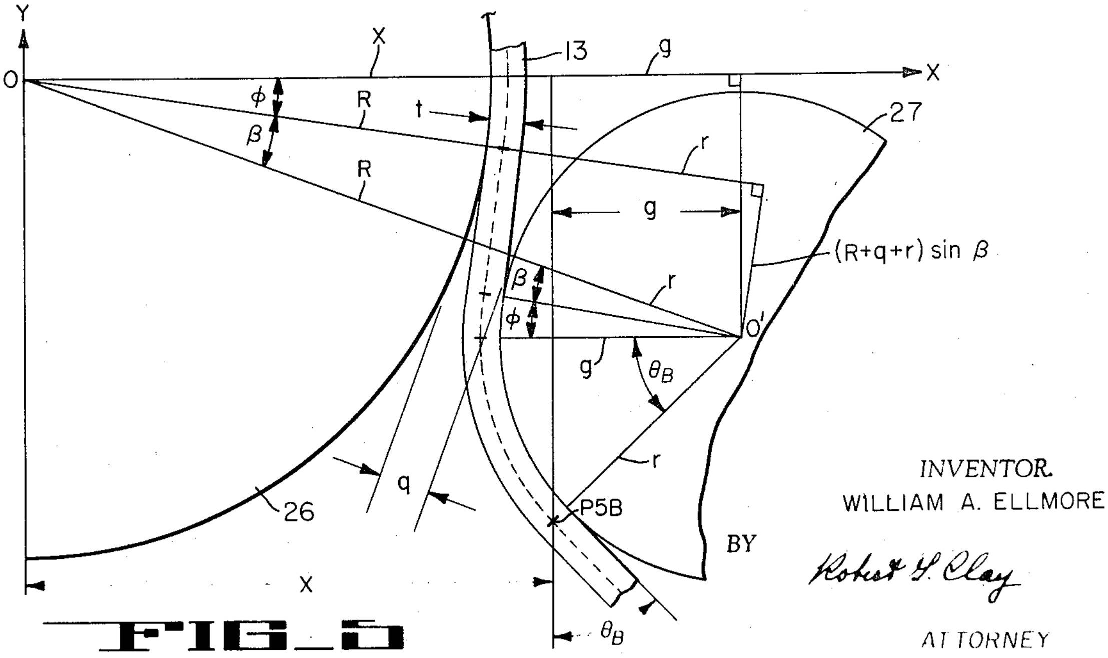
FIG. 5 is a schematic view illustrating certain features of the invention.

Referring now to FIGS. 3 and 5, a complete calculation is illustrated for the embodiment shown in FIGS. 1 and 2. The pitch angle $S$ is calculated from Equation (1), given a drum diameter $d$ of 4.55984251968 inches and an effective tape width $w$ corresponding to a video rise of 10.1 mm, slightly less than the actual tape width of one-half inch (12.7 mm) for the sake of margin. In a practical machine it is desirable to increase the basic 180° angle of tape wrap by a small increment $\phi$ at each end (e.g. $\phi = 5°$) to allow overlap for switching heads in the well-known manner. However, the effective scanning angle $\alpha$ is still 180° and $S$ is then 3.18246697320°

To calculate the terms X and Y for Equation (2), it is necessary to take into consideration certain other parameters not heretofore mentioned. The tape has a finite thickness $t$ which must be considered, particularly since it is desirable to have the entrance guide 27 spaced from the drum guide 26 for a dimension $q$ that is substantially greater than the tape thickness to allow for smooth self-threading operation. As seen in FIG. 5, the dimension from the center O of the scanning assembly to the center O' of guide 27 is R+q+r, wherein R and r are the radii of the drum 26 and guide 27 respectively; and this dimension is also the hypotenuse of a right triangle the base of which is the sum R+t+r. In other words, the guide 27 must be offset angularly clockwise from the wrap angle $\alpha$ ($\phi$) by an angle $\beta$ such that:

$$\cos\beta = (R+t+r)/R+q+r). \qquad (7)$$

With values of $r$ = 0.2150 inches, $t$ = 0.0007 inches, and $q$ = 0.0150 inches, $\beta$ becomes 6.11902195573°. The third side of the above mentioned triangle then is seen to be $(R+q+r)\sin\beta$, which is equal to the length of the straight segment of tape between the guides 26, 27. For finding Y then, to this length must be added the two lengths of tape that are wrapped on the guides between $C_1$ and P5B, for Y is the total length multiplied by the tangent of $S$ (FIG. 3). In the final Equation (8) below, the length of tape on guide 26 is the first term within the brackets, and the length on guide 27 is the last term within the brackets:

$$Y = \text{Tan } S\left[2\pi\left(R+\frac{t}{2}\right)\left(\frac{90+\phi}{360}\right) + (R+q+r)\sin\beta + 2\pi\left(r+\frac{t}{2}\right)\left(\frac{\beta+\theta B}{360}\right)\right] \qquad (8)$$

the angle $\theta_B$ being the vertical projection to a horizontal plane of the untilted angle $\theta$ (see FIG. 4 also). It is noted that as a practical matter, the term $t/2$ in Equation (8) can be set equal to zero and neglected; and in Equations (9) and (11) below, as well.

Since the assembly is to be tilted through $T$ until the point P5 lies in the horizontal plane of the tilt axis, the X dimension along the $x$-axis from the tilt or $y$-axis to point P5B is also needed, and is found as follows. The $x$-axis coordinate $X_O$ of the center of drum 27 is clearly the sum of X and a quantity $g$ which also is related to $\theta_B$ as follows:

$$g = \left(r+\frac{t}{2}\right)\cos\theta_B \qquad (9)$$

Also: $X_O = (R+q+r)\cos(\phi+\beta)$, (10)

and:

$$X = (R+q+r)\cos(\phi+\beta) - \left(r+\frac{t}{2}\right)\cos\theta_B \qquad (11)$$

while from FIG. 3:

$$h = l\tan S = l\sin\theta_B\tan T, \text{ or:} \qquad (12)$$

$$\theta_B = \sin-1\ (\tan S/\tan T). \qquad (13)$$

Thus, putting $\theta_B$ into Equations (8) and (11), and putting the resulting expressions for X and $Y$ into Equation (2), it is found that $T$ = 5.82846434413°; and putting the values found for $S$ and $T$ into Equation (3), it is found that $\theta$ = 33.1397611060°.

THE TAPE EDGE GUIDES

In order to ensure that the tape enters and leaves the scanning assembly guide structure at the correct level and in the desired plane parallel to the top plate, the guides 23 and 33 are arranged with edge guiding flanges 71 and 72. The lower flange 71 is formed on the bottom of a threaded tape-engaging sleeve 73, of small pitch angle, which is threaded onto an upstanding main post 74 so that the general level of the edge-guiding assembly can be manually adjusted during operation. Backlash or looseness in the screw threads is taken up by a strong helical compression spring 76. The frictional engagement of the screw threads provided by the spring 76 together with the small pitch angle of the threads is sufficient to lock the sleeve 73 against inadvertent manual rotation or rotation caused by passage of the tape 13. The upper flange 72 is formed as a separate element, and is slidably mounted on a smooth portion of the post 74. The axial length of the sleeve 73 is slightly less than the width of the tape 13, so that the flange element 72 rests lightly upon the upper edge of the tape; and the element 72 is also very lightly downwardly loaded by a light compression spring 77 bearing against a flange 78 that is locked on to the post 74 by means of a threaded nut 79. A pin 80 extending from the flange 78 and slidably into element 72 prevents the element 72 from rotating as the tape passes by.

In addition to the two edge guiding structures at posts 23, 33, there is also provided a lower tape edge guide 81 (FIG. 2) consisting of a plate secured to the lower drum guide 26b at the midpoint of the wrap angle, or substantially on the drum 16b generatrix where the centerline of the tape crosses the desired plane parallel to the top plate (point $C_1$ in FIG. 4). The plate 81 abuts the mounting plate 52 and is secured to the guide 26*b* by means of bolts 82. The upper edge of the plate 81 if formed on an arc of large radius (e.g. 20 inches) tangent to the lower edge of the tape at the generatrix of the tilt axis. To ensure that the tape will be lightly but firmly loaded against this guide 81 under all circumstances, the angle $\theta$ at the entrance guides 23, 27 is increased by a small increment, e.g. 5°; that is to say, guide 23 is set so that the actual angle between the tilt axis and the tape centerline extending between guides 23 and 27 is $\theta + 5°$, the pure angle $\theta$ being calculated by means of Equation (3). It has been observed in the exemplary structure dimensioned as calculated above, that this increment of 5° over the pure entrance angle $\theta$ causes a drop of the tape at point $C_1$, when the guide 81 is removed, of about 0.09522 inches. It has also been observed that increasing or decreasing the exit angle by a like amount causes no noticeable change in the tape path at point $C_1$.

STOP MOTION EFFECTS

In order to produce a stop motion effect, that is, to produce a still picture with the tape standing still, it is necessary to tilt the plate 52 and scanning assembly by a slight additional increment over the previously calculated angle $T$ so that the rotating heads repeatedly track the same slanted track on the tape. It will be understood that the path traced by the heads on the unmoving tape lies at a greater angle to the tape centerline than do the tracks laid down during recording on the moving tape, because there is a component of relative motion produced by the moving heads under both conditions, but during tape movement in the direction opposite to that of the heads there is an added component of relative movement produced by the movement of the tape. To produce the necessary increase over $T$ during stop motion operation, there is provided for example, a solenoid 86 the coil or stator of which is fixedly mounted below the top plate 51, while the armature or plunger 87 is coupled to an extension 88 of the scanning assembly plate 52. With the coil of the solenoid de-energized, the plunger 87 is loaded by means of a spring 89 to urge the extension 88 downwardly against the lower portion of a bracketing stop element 91 mounted on the top plate. In this position the scanning assembly is at the correct angle $T$ for normal speed recording and playback operation. When it is desired to increase the tilt to stop motion condition, the coil of the solenoid 86 is energized and urges the plunger 87 upwardly until the extension 88 is stopped against the upper portion of the bracketing stop element 91. Since the tape does not shift appreciably when the scanning assembly is thus incrementally tilted, the angle S is also augmented. It has been found in the exemplary apparatus dimensioned as previously calculated, that the incremental addition to the pure angle $S$ necessary to produce stop motion conditions, is about 4.4178 seconds of arc.

THE SUPPLY REEL

Figure 6:
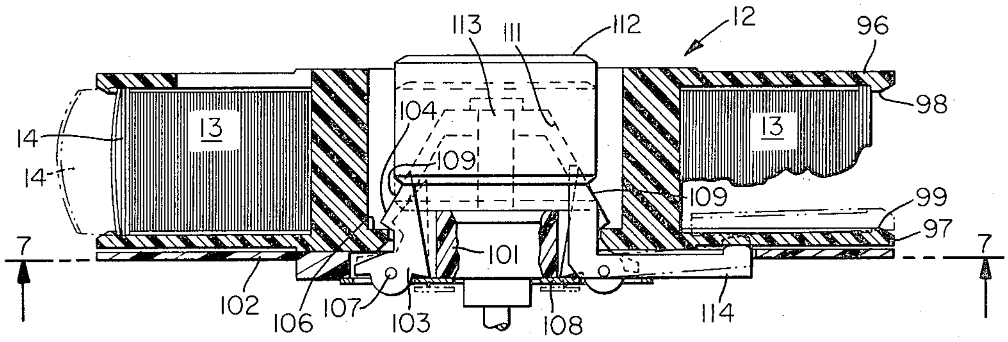
FIG. 6 is a broken-away cross-section to an enlarged scale, taken on the plane of lines 6—6 of FIG. 1.

Handling of the tape away from the machine is facilitated by arranging the supply reel and tape as a self-contained unit in which the wound threading leader acts as a peripheral retainer for the tape, preventing it from loosening or unwinding accidently during transfer or storage. Referring to FIGS. 2, 6 and 7, it will be seen that the side flanges 96, 97 of the supply reel 12 have inwardly turned peripheral flanges 98, 99 formed thereon. The actual tape width is smaller than the dimension between the confronting portions of the flanges 98, 99, but the width of the stiff leader 14 is greater, although less than the corresponding dimension between the side flanges 96, 97. Consequently, when the tape and leader are wound tightly on the supply reel, the outer leader coils are retained firmly by the flanges 98, 99, with only the rounded tip of the leader projecting tangentially outwardly. To be stripped off the reel, the leader must be transversely bowed so as to slip between the flanges 98, 99, as hereinafter described. However, the supply reel has another important feature in that it is arranged to cooperate with the transport supply reel hub 101 and turntable 102 for easy manual coupling and removal. The integral hub and turntable assembly is provided with a number of spaced latch arms 103 which include detent projections 104 that engage an inwardly extending flange 106 on the supply reel to lock the reel in operating position on the turntable. The arms 103 are pivoted on pins 107 mounted in the hub and turntable assembly so as to be retractable inwardly, as shown in phantom in FIG. 6, to release the supply reel for removal when desired. The arms 103 however, are springloaded as by a springy plate 108 to tend toward the reel locking position; and for releasing operation the arms are provided with upwardly and inwardly inclined cam follower surfaces 109 that are engaged by a similarly inclined hollow conical cam surface 111 formed on a push-button 112 mounted for limited axial movement on an upwardly extending central shaft 113 of the hub and turntable assembly. Thus, when the push-button 112 is pushed downwardly, the arms 103 are pivoted inwardly and the supply reel is released; but at the same time a subsidiary pivoted arm 114 having a similar cam follower surface 109, but no spring load, is pivoted inwardly, and an extension 116 thereof is caused to pivot upwardly to engage the lower side flange 97 of the supply reel and eject the supply reel upwardly into the fingers of the operator.

THE THREADING OPERATION

Figure 8:
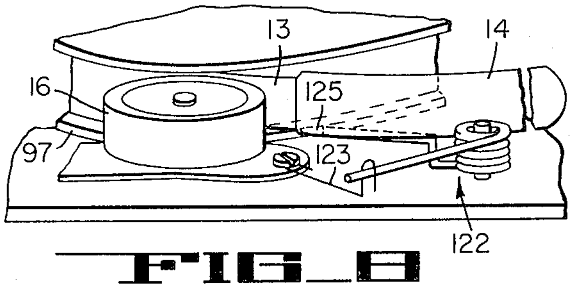
FIG. 8 is an enlarged perspective view of a portion of the apparatus shown in FIG. 1.

When the supply reel has been placed on the machine as above described, the operator places the control means 121 (FIG. 1) in "thread" mode. The control means then causes rotation of the puck 16 arm to engage the puck with the outer layer of leader on the supply reel, and energizes the driving motor (not shown) for the puck 16 to drive the supply reel in anti-clockwise direction as shown in FIG. 1. The control means also causes actuation of a springloaded stripper finger 122 to stripping position (as shown in phantom in FIG. 1 and in solid in FIG. 8) to strip the leading end of the leader from the supply reel and direct it between the guide 17 and tension sensing arm 18, which is coupled to a brake on the supply reel turntable to control tape tension during normal operation. The finger 122 is formed of springy wire and is coupled by a link 123 to the end of the pinch roller 16 arm for actuation when the arm is actuated. The finger has a lower portion 124 set low enough to clear the bottom of the leader 14, and an offset upper terminal portion 125 projecting in the stripping position above the lower supply reel flange 97 so as to strip off the lower edge portion of the leader but set too low to effectively strip off the lower edge portion of the tape 13. After stripping, the leader is driven on past head 19 and between guides 23 and 24; between guides 26, 27 and 26, 31; between guides 32, 33; between guide 34 and elements 36, 37, 38; between capstan 39 and retracted pinch roller 41 and on to the takeup reel where it is secured by fingers 44 to the rubber surfaced hub 46. The takeup reel motor (not shown) has also been energized by the control means 121 and begins to wind up the leader thereon. At a subsequent moment, an aluminum tab (not shown) on the tape near the leader end thereof contacts the transistor circuit 47, which thereupon, sends a signal to the control means to place the apparatus in operating condition, with the motors (not shown) of the capstan 39 and scanning drum 59 energized and the pinch roller 41 engaged, with the puck 16 retracted and its motor de-energized, with the stripper finger 122 withdrawn, and the plate 25 on which the head 19 and guide 22 are mounted rotated to its operating position, as shown in solid lines in the drawing; alternatively, the control means can be arranged, upon receiving the signal from means 47, to place the apparatus in "stop" or "stand-by" mode, differing from the operating mode in that the pinch roller 41 is retracted so that the tape is stopped. The control means may also be arranged to produce a rewind mode in which the pinch roller is withdrawn and the reel 12 is operated in a reverse direction.

THE SCANNING ASSEMBLY

As shown in FIGS. 2 and 9, the scanning 59 is mounted for rotation on a central shaft 130 on which is also mounted a first (rotating) transformer half 131 for transmission of video signals to and from the heads 61, 62 via a second (stationary) transformer half 132 spaced very slightly (e.g., 5 mils) from the half 131 so as to avoid frictional contact. The rotating transformer half 131 is formed of ferrite material and has two concentric coils 133, 134 inset into the face thereof and coupled respectively to the heads 61, 62. The stationary transformer half 132 is formed as a mirror image of half 131 and the corresponding coils thereof are coupled through a switching apparatus (not shown) to stationary video circuits (not shown) of conventional type. The adjustment and spacing of the two transformer halves is accomplished as follows. Each element 131, 132 is mounted on a backing plate 136, 137 respectively. The plate 136 is attached by three equispaced springloaded bolts 138 to the central web portion of the scanning bar 59, the bolts being threaded into the scanning bar but turning freely in plate 136; and plate 137 is similarly attached by springloaded bolts 139 to the cover plate 141 of the scanning assembly, except that here the bolts 139 are threaded into plate 137 but turn freely in cover plate 141. Thus, both sets of adjusting bolts can be reached from above. First, with the cover plate 141 and attachments removed, the transformer half 131 is adjusted by bolts 138 until the active face thereof is rotating true in a plane normal to the axis of shaft 130. Then the cover plate 141 is mounted and bolts 139 are adjusted until transformer half 132 evenly engages half 131, whereupon the bolts 139 are backed off slightly to provide the desired non-contact clearance between the two transformer halves.

Switching of the video heads 61, 62, as one head leaves the tape and the other comes on, is controlled by means of a pair of magnets 146, 147 inset in opposite arms of the bar 59, one of the magnets being mounted with the north pole up and the other with the north pole down, so as to create opposite-going voltage pulses or spikes in a pickup coil 148 and pole 149 structure mounted above the magnets. The pole piece 149 has a pair of downwardly turned pickup tips 151 diametrically located with respect to one another and at the same radius as the magnets 146, 147. Signals from the coil 148 are transmitted to the switching means previously mentioned for switching the heads in the conventional manner as they arrive upon and leave the tape. Also mounted on the shaft 130 below the scanner bar is a tachometer disc 156 having a number (e.g., 525) of precision-cut peripheral teeth 157. A stationary hollow circular pickup plate 158 having an equal number of inwardly directed teeth 159 is mounted in the same plane and with a minimal radial clearance (e.g., 5 mils) between the tips of the teeth 157, 159 at their closest approach. Supporting the plate 158 are two pairs of semi-circular pole elements 161, 162, which are in turn mounted upon a bottom plate 163. A toroidal pickup coil 164 is mounted within the compass of the pole elements 161, 162 and between the plates 158, 163 and a toroidal rubber magnet 166 is mounted on bottom plate 163 below the disc 156. The rubber magnet 166 is formed of commercially available material of the type having a number of fine metallic particles embedded in a rubber matrix and magnetized so as to produce opposite poles aligned in either the axial or radial direction of the tachometer, so that a magnetic circuit is formed through the coil 164, the reluctance of the circuit varying cyclically as the teeth 157, 159 come into and go out of tip alignment, such that a correspondingly varying voltage signal is generated in the coil 164 for indicating the rotational speed of the scanning assembly, as an aid in controlling that speed in a conventional manner.

Thus there has been described a helical scan magnetic tape apparatus arranged so that the tape centerline follows a path substantially parallel to the top plate of the machine, the scanning drum and guides therefor being tilted at an angle to the top plate. Exit and entrance guides for the tape at the drum are parallel to the drum axis and therefore also tilted, but all other tape guides are normal to the top plate. The tape is taken off the entrance and exit guides at a predetermined angle that ensures parallelism of the tape centerline to the top plate. A supply reel with the tape and a stiff leader mounted thereon is provided, together with a means for driving the leader to the takeup reel, which is provided with means for securing and wrapping the leader and tape. The drum is also arranged for precise change of tilt to facilitate stop and slow motion effects. The tape supply reel is arranged for quick and easy mounting on and removal from the apparatus. A scanner assembly transformer signal coupling and tachometer is also provided.

What is claimed is:

1. A helical-scan magnetic tape apparatus comprising:

a drum-shaped tape scanning and guide assembly having said tape wrapped helically at least part way thereabout at a predetermined pitch angle S;

said drum-shaped scanning and guide assembly containing two diametrical magnetic transducing heads rotating in a plane normal to the axis of said assembly, the wrap angle of said tape on said assembly being equal to or slightly greater than 180°;

a pair of first entrance and exit guide elements mounted in axial parallelism with said guide assembly; and second guide means mounted perpendicular to a predetermined reference plane for guiding said tape downstream to and from said respective entrance and exit guide elements;

said scanning and guide assembly and said first guide elements being tilted with respect to said reference plane for a predetermined angle $T$ about a diametrical axis parallel to said reference plane and bisecting the wrap angle of said tape centerline on said scanning and guide assembly;

said second guide means being positioned so that said tape centerline between said second guide means and said first guide elements makes an angle of substantially $\theta$ with said diametrical axis, wherein $\sin S = \sin \theta \sin T$;

whereby said tape may be threaded around and guided to and from said scanning and guide assembly in a path substantially parallel to said reference plane.

2. A helical-scan magnetic tape apparatus as described in claim 1, wherein:

means are provided for driving said tape in longitudinal motion in a path parallel to said reference plane as for recording on said tape; and means are provided for stopping said tape and for varying the tilt of said scanning and guide assembly to cause stop-motion and slow-motion reproduce scanning of a recorder tape.

3. A helical-scan magnetic tape apparatus as described in claim 2, wherein said tilt varying means includes:

trunnion bearings for enabling tilting of said drum-shaped scanning assembly around said diametrical axis;

bracketing stop means for limiting said scanning assembly a tilt range between the angle $T$ and a second angle slightly differing from $T$ and corresponding to correct tracking of said heads, with the tape stationary, along the tracks that are made by said heads on the moving tape at tilt angle $T$, said scanning assembly being springloaded toward the $T$-end of said range; and solenoid means for tilting said scanning assembly toward the second angle.

4. A helical-scan magnetic tape apparatus as described in claim 1, wherein:

said second guide means includes a pair of cylindrical guide members and edge guide means associated therewith for holding said tape centerline in said second plane.

5. A helical-scan magnetic tape apparatus as described in claim 4, wherein:

said scanning and guide assembly is provided with a lower edge guide means for said helically wrapped tape substantially at the midpoint of said tape wrap angle; and said cylindrical guide member associated with the entrance guide element of said scanning and guide means is positioned to hold said tape centerline extending to the associated entrance guide element at an angle to said diametrical axis that is slightly greater than $\theta$;

whereby said helically wrapped tape is pressurized and edge loaded against said lower edge guide means.

6. A helical-scan magnetic tape apparatus as described in claim 5, wherein said angle between said diametrical axis and said tape centerline between said entrance guide element and member is $\theta + 5°$.

7. A helical-scan magnetic tape apparatus as described in claim 4, wherein each of said cylindrical guide members includes:

a central cylindrical post member mounted upstanding normally on said top plate;

a cylindrical sleeve element threaded on said post, said sleeve having a tape engaging surface slightly shorter than the width of said tape, and a lower flange for guiding the lower edge of said tape; and an upper flange element slidably mounted on said post for engaging and guiding the upper edge of said tape, said upper flange being lightly downwardly loaded and being keyed to said post to inhibit rotation of said upper flange.

8. A helical-scan magnetic tape apparatus as described in claim 7, wherein:

said sleeve element is springloaded upwardly to take up threading backlash and to frictionally load said post and sleeve to inhibit rotation of said sleeve; and said upper flange element is lightly springloaded downwardly.

9. A helical-scan magnetic tape apparatus as described in claim 4 wherein said angle $T$ is the arctangent of:

a quantity $Y$ representing the vertical coordinate, to said second plane, of the untilted position of a point on said tape centerline upstream or downstream from said respective entrance and exit guide elements; divided by a quantity X representing the horizontal coordinate, normal to the vertical plane said tilt axis, of said untilted position of said point.

10. A helical-scan magnetic tape apparatus as described in claim 9 wherein:

said point is an upstream or downstream point of tangency of said tape centerline with said respective entrance and exit guide elements.

11. A helical-scan magnetic tape apparatus as described in claim 10 wherein:

said entrance and exit guide elements are radially offset from said drum-shaped scanning and guide assembly for a dimension $q$ that is substantially greater than the tape thickness $t$.

12. A helical-scan magnetic tape apparatus as described in claim 11, wherein:

said entrance and exit guide elements are angularly offset upstream and downstream, respectively, from the tangent points of said tape centerline on said drum-shaped guide, for an angle $\beta$ such that $(R+q+r)\cos\beta = (R+t+r)$, wherein $R$ is the radius of said drum-shaped guide and $r$ is the radius of said respective guide element.

13. A helical-scan magnetic tape apparatus as described in claim 10, wherein:

$$y=\text{Tan } S\left[2\pi\left(R+\frac{t}{2}\right)\left(\frac{90+\phi}{360}\right)+(R+q+r)\sin\beta+2\pi\left(r+\frac{t}{2}\right)\left(\frac{\beta+\theta_B}{360}\right)\right]$$

wherein $\phi$ is an arbitrarily selected small angle in the order of 5° by which the scanning angle of 180° is augmented at either side for switching overlap, and $\theta_B$ is the vertical projection of the angle $\theta$, satisfying the equation:

$$\tan S = \sin\theta_B \tan T.$$

14. A helical-scan magnetic tape apparatus as described in claim 13, wherein:

$$X=(R+q+r)\cos(\phi+\beta)-\left(r+\frac{t}{2}\right)\cos\theta_B$$

15. A helical-scan magnetic tape apparatus as described in claim 14 in which the quantity $t/2$ only is set equal to zero and neglected.

16. A helical-scan magnetic tape apparatus as described in claim 14, wherein:

the pitch angle S satisfies the equation:

$$\pi d\alpha \sin S = 360w;$$

wherein $d$ is the drum-shaped guide diameter, $\alpha$ is the scanning angle, and $w$ is the effective transverse width of the central portion of tape on which the signals are to be recorded by the helically scanning transducing heads.

17. A helical-scan magnetic tape apparatus as described in claim 1, wherein:

said tape is provided with a relatively stiffer but still flexible leader and is retained thereby coiled upon a supply reel when not in use;

said apparatus includes a spindle for said supply reel, a driving puck engageable with said leader on said supply reel for driving said supply reel in threading rotation and said leader in a path lying in said second plane and guided by said second guide means to said scanning assembly and thence between a capstan and pinch roller to a tape take-up means; and sensing and control means for sensing the arrival of said leader at a position downstream from said capstan and pinch roller, and for thereupon activating said capstan and pinch roller for driving said tape and concurrently de-activating said driving puck.

18. A helical-scan magnetic tape apparatus as described in claim 17, wherein:

said second guide means also includes stripper means controlled by said control means to strip said leader from said supply reel during said threading rotation and direct said leader toward said scanning assembly.

19. A helical-scan magnetic tape apparatus as described in claim 18, wherein:

said supply reel has a hub and a pair of side flanges having inwardly directed leader retaining peripheral flanges thereon;

said tape having a width dimension such that said tape passes freely between said peripheral flanges;

said leader having a greater width dimension such that said leader passes freely between said side flanges but is retained by said peripheral flanges; and said leader having a rounded leading tip that projects tangentially through said peripheral flanges when said leader is coiled on said supply reel.

20. A helical-scan magnetic tape apparatus as described in claim 19, wherein said stripper means comprises a stripper finger having:

a wire-formed tip portion closely overlying the inner side of one of said supply reel side flanges so as to strip off the corresponding edge portion of said leader but not said corresponding edge portion of said tape; and an off set shank portion clearing said corresponding edge portion of said leader.

21. A helical-scan magnetic tape apparatus as described in claim 19, wherein said tape take-up means includes:

a motor-driven take-up hub having a high-friction surface for engaging and winding up said leader;

a housing for said take-up hub having a side opening for admission of said leader from said second guide means; and at least one resilient finger extending from said housing tangentially inward in the direction of rotation of said take-up hub and resiliently engaging said high-friction hub to direct and press said leader against said hub for snubbing of said leader thereon and winding up of said leader and tape on said take-up hub.

* * * * *

PO-1050
(5/69)

UNITED STATES PATENT OFFICE
CERTIFICATE OF CORRECTION

Patent No. 3,691,315 Dated September 12, 1972

Inventor(s) William A. Ellmore

It is certified that error appears in the above-identified patent and that said Letters Patent are hereby corrected as shown below:

Column 5, line 30, after "T" insert "÷".

Column 6, line 17, change "θB" to "$\theta_B$".

Column 6, line 35, change "$X_o$" to "$X_o$'".

Column 6, line 42, change "sin-1" to "$\sin^{-1}$".

Signed and sealed this 8th day of May 1973.

(SEAL)
Attest:

EDWARD M.FLETCHER,JR.
Attesting Officer

ROBERT GOTTSCHALK
Commissioner of Patents